(12) United States Patent
Degroote

(10) Patent No.: US 9,120,915 B2
(45) Date of Patent: Sep. 1, 2015

(54) POLYESTER COMPOSITION COMPRISING SILICA PARTICLES AND USE THEREOF FOR MAKING PACKAGING ARTICLES

(75) Inventor: Laurent Degroote, Caestre (FR)

(73) Assignee: Amcor Limited, Hawthorn (AU)

( * ) Notice: Subject to any disclaimer, the term of this patent is extended or adjusted under 35 U.S.C. 154(b) by 1570 days.

(21) Appl. No.: 11/920,896

(22) PCT Filed: May 16, 2006

(86) PCT No.: PCT/EP2006/004594
§ 371 (c)(1),
(2), (4) Date: Feb. 18, 2009

(87) PCT Pub. No.: WO2006/125549
PCT Pub. Date: Nov. 30, 2006

(65) Prior Publication Data
US 2009/0220712 A1    Sep. 3, 2009

(30) Foreign Application Priority Data
May 24, 2005  (EP) .................................... 05011205

(51) Int. Cl.
| B32B 1/02 | (2006.01) |
| C08K 3/36 | (2006.01) |
| B32B 1/08 | (2006.01) |

(52) U.S. Cl.
CPC ............... *C08K 3/36* (2013.01); *Y10T 428/131* (2015.01)

(58) Field of Classification Search
USPC ..................... 428/34.1, 34.2, 35.7, 35.9, 36.9
See application file for complete search history.

(56) References Cited

U.S. PATENT DOCUMENTS

| 2,993,799 | A | * | 7/1961 | Blake ......................... 106/169.15 |
| 3,549,586 | A | * | 12/1970 | Comstock et al. ............ 523/511 |
| 4,464,328 | A | * | 8/1984 | Yoshino et al. ............... 264/521 |
| 4,486,378 | A | * | 12/1984 | Hirata et al. ................. 264/512 |
| 4,874,647 | A | * | 10/1989 | Yatsu et al. .................. 428/35.7 |
| 4,918,156 | A | * | 4/1990 | Rogers ......................... 528/272 |
| 5,071,690 | A |  | 12/1991 | Fukuda et al. |
| 5,091,229 | A | * | 2/1992 | Golike et al. ................ 428/35.2 |

(Continued)

FOREIGN PATENT DOCUMENTS

| EP | 0 221 338 A | 5/1987 |
| EP | 0 386 450 A | 9/1990 |
| JP | 04-136063 A | 5/1992 |
| JP | 08-092467 A | 4/1996 |
| WO | WO-03/064267 A2 * | 8/2003 |

OTHER PUBLICATIONS

Database WPI Section Ch, Week 199624, Derwent Publications Ltd., London, GB, AN 1996-236253, XP002351431.
Database WPI Section Ch, Week 199225, Derwent Publications Ltd., London, GB; AN 1992-205271, XP002351519.
European Search Report dated Apr. 9, 2010 in corresponding European Patent Application No. EP 10154800 (seven pages).

*Primary Examiner* — Marc Patterson
(74) *Attorney, Agent, or Firm* — Harness, Dickey & Pierce, P.L.C.

(57) ABSTRACT

The polymeric composition comprising (A) a polyester resin and (B) micrometrical silica particles, preferably particles made of cristobalite or quartz, dispersed in the polyester resin preferably at concentration of at least 2 wt %. The polyester resin preferably comprises a PET homo or copolymer. Packaging articles, especially biaxially stretched blow molded containers, made with the said polymeric composition exhibit high opacity to UV and visible light radiations as well as improved barrier properties to $O_2$ and to water vapor, and improved thermal and mechanical properties.

18 Claims, 4 Drawing Sheets

(56) References Cited

U.S. PATENT DOCUMENTS

| | | | |
|---|---|---|---|
| 5,453,260 A * | 9/1995 | Nakazawa et al. | 423/327.1 |
| 5,563,222 A * | 10/1996 | Fukuda et al. | 525/437 |
| 6,001,439 A * | 12/1999 | Kawakami et al. | 428/35.7 |
| 6,323,271 B1 | 11/2001 | Caldwell et al. | |
| 6,749,785 B2 * | 6/2004 | Subramanian et al. | 264/173.16 |
| 7,253,230 B2 * | 8/2007 | Damman et al. | 525/64 |
| 2002/0015835 A1 | 2/2002 | Peiffer et al. | |
| 2002/0160171 A1 | 10/2002 | Peiffer et al. | 428/220 |
| 2002/0177672 A1 * | 11/2002 | Matsuoka et al. | 525/416 |

* cited by examiner

POLYESTER COMPOSITION COMPRISING SILICA PARTICLES AND USE THEREOF FOR MAKING PACKAGING ARTICLES

CROSS-REFERENCE TO RELATED APPLICATIONS

This application is a 371 National Stage of International application No. PCT/EP2006/004594, filed May 16, 2006 and published in English as WO 2006/125549 A1 on Nov. 30, 2006. This application claims the benefit of EP 05 011205.1, filed May 24, 2005. The disclosures of the above applications are incorporated herein by reference.

FIELD OF THE INVENTION

The present invention relates to a polyester-based composition for making packaging articles, and more preferably moulded packaging articles, such as containers or bottles. The polyester-based composition of the invention comprises silica particles. The invention further relates to packaging articles, and in particular moulded packaging articles, such as containers or bottles, made from said polyester-based composition. In particular, the packaging articles of the invention exhibits high opacity, especially at wavelengths up to 700 nm and more especially between 400 nm and 500 nm, and/or improved mechanical properties, and/or improved thermal properties and/or improved gas barrier properties.

PRIOR ART

Aromatic polyester resins, and in particular polyethylene terephthalate (PET), are widely used in the packaging industry for making various packaging articles. The wording "packaging article" used therein refers to any article that is used for storing any product or material, and especially (but not only) food or beverages. For example, a packaging article can be a hollow and rigid container, such as bottle, jar or the like, a flexible plastic container, a film or a sheet for a package.

PET is a polymer widely used for making transparent packaging articles. In particular PET is used in the packaging industry for making transparent biaxially stretched containers having good mechanical properties (top load, burst pressure) and good thermal performances. Packaging articles made of PET alone are however not suitable for storing products that are sensible to ultraviolet radiations and/or visible light radiations (i.e. that can be altered or degraded by light radiations and/or by light induced oxidation), such as for example dairy products in the food industry. Such light sensible products need to be stored in opaque packaging articles having a low transmission at wavelengths up to 700 nm, and more especially for visible light radiations between 400 nm and 550 nm.

A first solution for making a low light transmission packaging articles consists in using an aromatic polyester composition, and for example a PET resin, mixed with a sufficient amount of opacifying agents such as for example titanium dioxide ($TiO_2$). The use of opacifying agents such as $TiO_2$ gives good result in terms of opacity, but is extremely costly because of the high price of $TiO_2$.

A second solution for making truly opaque packaging articles consists in making multilayered packaging articles including a black layer. This solution is efficient in terms of opacity to UV (wavelengths up to 400 nm) and visible light (wavelengths ranging from 400 nm to 700 nm) and is commonly used for example in the food industry for storing dairy products such as UHT milk. This solution is however more costly than a monolayer solution.

There is thus a need in the packaging industry to have an aromatic polyester composition that can be used for making low cost packaging articles and in particular monolayer opaque packaging articles, with a low light transmission up to 700 nm, and more especially between 400 nm and 500 nm, as well as high mechanical, thermal and gas barrier properties.

OBJECTIVES OF THE INVENTION

A main and general objective of the invention is to propose a novel polyester-based composition suitable for making packaging articles.

A further and more particular objective of the invention is to propose a novel polyester-based composition suitable for making packaging articles that are opaque, and in particular that have very low transmission characteristics for UV radiations (up to 400 nm) and/or for visible light radiations (from 400 nm up to 700 nm), more especially between 400 nm and 550 nm.

A further and more particular objective of the invention is to propose a novel polyester-based composition suitable for making packaging articles, and more especially moulded packaging articles, having improved mechanical properties.

A further and more particular objective of the invention is to propose a novel polyester-based composition suitable for making packaging articles, and more especially moulded packaging articles, having improved thermal properties.

A further and more particular objective of the invention is to propose a novel polyester-based composition suitable for making packaging articles, and more especially moulded packaging articles, having improved gas barrier properties.

It is a further objective of the invention to propose a polyester-based composition that can be processed into a biaxially stretched container, especially a stretch blow moulded container.

SUMMARY OF THE INVENTION

All or part of these objectives is achieved by a polymeric composition comprising (A) a polyester resin and (B) micrometrical silica particles.

Preferably, the micrometrical silica concentration is at least 2 wt % and higher concentrations are even preferred.

The terms "micrometrical particles" used therein mean particles having a particle size of at least 1 µm.

The terms "particle size" used therein mean the diameter of the particles measured by any standard laser diffraction method and for example the standard Malvern laser diffraction method. The laser diffraction method is well known in the prior art and is commonly used for measuring the size distribution of particles. It has to be reminded that with a laser diffraction method such as the Malvern diffraction method, the volume of the particles is actually measured, and the particle diameters are calculated from the measured volume of the particles, but with the assumption that the particles are spherical. Consequently, the diameter of the particle is calculated from a sphere equivalent volume equal to the measured volume of the particle.

The terms "silica particles" used therein mean any particle having a silica content of at least 50 wt %.

Within the scope of the invention, the "polyester resin" may be constituted of a single polymer (the polyester), or of a copolyester, or of a polymer blend wherein at least one component is a polyester or a copolyester.

Pursuant to the invention, the dispersion in the polyester resin of micrometrical silica particles in a sufficient amount dramatically and surprisingly improves the optical properties of the packaging article made from the polymeric composition. In particular, low transmission at wavelengths up to 700 nm, and more especially between 400 nm and 550 nm can be achieved at low production cost. Furthermore, the thermal stability, the mechanical properties and the gas barrier properties of the packaging article are also surprisingly enhanced.

Polyester resins that are suitable for carrying out the invention are those generally obtained through polycondensation of diols and dicarboxylic acids or esters thereof.

Among the diols suitable for carrying out the invention, one can mention: ethylene glycol, diethylene glycol, propylene glycol, 1,3-propanediol, 1,4-butanediol, 1,3-butanediol, 2,2-dimethylpropanediol, neopentyl glycol, 1,5-pentanediol, 1,2-hexanediol, 1,8-octanediol, 1,10-decanediol, 1,4-cyclohexanedimethanol, 1,5-cyclohexanedimethanol, 1,2-cyclohexanedimethanol, or mixtures thereof.

Among the dicarboxylic acids suitable for carrying out the invention, one can mention: terephthalic acid, isophthalic acid, orthophthalic acid, 2,5-naphthalene dicarboxylic acid, 2,6-naphthalene dicarboxylic acid, 1,3-naphthalene dicarboxylic acid, 2,7-naphthalene dicarboxylic acid, methyl terephthalic acid, 4,4'-diphenyldicarboxylic acid, 2,2'-diphenyldicarboxylic acid, 4,4'-diphenylether dicarboxylic acid, 4,4'-diphenylmethanedicarboxylic acid, 4,4'-diphenylsulfonedicarboxylic acid, 4,4'-diphenylisopropylidene-dicarboxylic acid, sulfo-5-isophthalic acid, oxalic acid, succinic acid, adipic acid, sebacic acid, azelaic acid, dodecanedicarboxylic acid, dimer acid, maleic acid, fumaric acid, and all aliphatic diacids, cyclohexane dicarboxylic acid. The dicarboxylic acids can be introduced in the polycondensation medium in an esterified form, for example via methoxy or via ethoxy.

The preferred polyesters for carrying out the invention are polyethylene terephthalate (PET), homo or copolymers thereof, and mixtures thereof.

The polyester/silica composition of the invention can be prepared by several methods, including notably compounding methods. In the compounding methods, the inert silica particles can be dispersed and mixed in the molten polyester resin, for example by using an extruder (single or twin screw extruder). The compound can be also used as a master batch and blended with another resin, preferably a polyester resin. In another method, the silica particles can be also introduced in the polyester reaction medium, preferably before the polymerization starts, said polymerization being carried out in the presence of the silica particles.

The polyester/silica composition of the invention can be used for making various kinds of packaging articles, and notably rigid containers or flexible containers, or films or sheets.

The polyester/silica composition of the invention is more especially particularly suitable for making monolayer packaging articles. However the polyester/silica composition of the invention can also be used for making a multilayer packaging article, wherein at least one of the layers is made from the composition of the invention.

For carrying the invention, any micrometrical silica particles having at least 50 wt % of $SiO_2$ can be used. Among the preferred silica particles, one can use cristobalite or quartz.

Preferably, high purity silica particles will be used, in particular silica particles comprising at least 90 wt % of $SiO_2$, more preferably at least 95 wt % of $SiO_2$, and even more preferably at least 99 wt % of $SiO_2$.

Polymeric compositions of the invention have been more particularly used for making biaxially stretched container (jar, bottles or similar), in particular by using well-known injection stretch blow moulding techniques (one stage or two stages). It has to be underlined that surprisingly, and against all expectations, when carrying the invention, the introduction of the micrometrical silica particles in the polyester resin does not impair the processability of the polyester resin during the injection step (i.e. manufacturing step of the preform by injecting the polymeric composition into a mould).

On the contrary, the polymeric composition of the invention is surprisingly easier to inject than a standard grade PET resin. It involves that very thin preforms (typically preforms having a wall thickness lower than 2.5 mm) can be more easily injected, with the polymeric composition of the invention. In comparison, with standard grade PET resin, it is very difficult to inject very thin preforms because the cooling down of the resin during the injection step is too fast.

With the polymeric composition of the invention, the blowing of the preforms is more difficult (in comparison to the use for example of a standard grade PET resin) and this difficulty is increasing with the concentration of silica particles in the composition, which in turns leads to preferably (but no necessarily) carry the blowing step with very low stretch ratios and/or with thin preforms.

Other additional and optional technical characteristics of the invention are mentioned in the claims.

SHORT DESCRIPTION OF THE DRAWINGS

Other characteristics and advantages of the invention will appear more clearly on reading the following detailed description which is made by way of non-exhaustive and non-limiting example, and with reference to the accompanying drawings, in which.

DETAILED DESCRIPTION OF THE INVENTION

Figure 1:
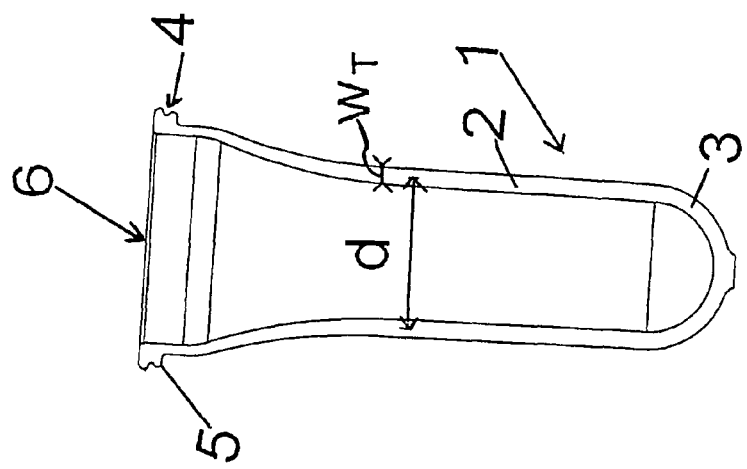
FIG. 1 is schematic drawing of a monolayer preform.

The following detailed description is focused on the specific use of several examples of polyester/silica compositions of the invention for making biaxially stretched containers (hereafter described and referred as examples No. 2 to No. 8 and compared notably to a reference container referred as example No. 1), by using the well-know injection blow moulding technique. Nevertheless, it must be underlined that the scope of the invention is neither limited to that specific use, nor to the specific polyester/silica compositions of examples No. 2 to No. 8.

The polyester/silica compositions of the invention can advantageously and more generally be used for making any kind of packaging articles, and more especially opaque packaging articles.

For example, one can also use the polymeric composition of the invention for making a packaging article (flexible or rigid) by any other known technique, and for example by using the extrusion blow moulding technique. One can also use the invention for making flexible films or sheets. The packaging article of the invention can have a monolayer structure or multilayer structure wherein at least one of the layers is made from a polyester composition of the invention.

Examples No. 1 to No. 8

Preparation of the Composition

A polyester/silica compound (A1/B) is prepared in a first compounding step. In a second step, said polyester/silica compound (A1/B) is blended as a master batch with a second polyester resin (A2).
Compounding Step: Polyester/Silica Compound (A1/B)
Said compound is made with 55 wt % of PET pellets (A1) and 45 wt % of micrometrical silica particles (B).
More particularly PET pellets (A1) are those commercialized under reference 9921 P by company named from VORIDIAN.
The silica particles (B) are made of cristobalite. Cristobalite is high purity silica having a narrow particle size distribution.
In particular, the cristobalite particles are for example those commercialized under reference Sibelite® M 6000 by company named SIBELCO.
The composition of Sibelite® M 6000 particles is given in table 1 below.

TABLE 1

| Sibelite ® M 6000 composition | |
|---|---|
| $SiO_2$ | 99.5% |
| $Fe_2O_3$ | 0.03% |
| $Al_2O_3$ | 0.20% |
| $TiO_2$ | 0.02% |
| $K_2O$ | 0.05% |
| CaO | 0.01% |

The Sibelite® M6000 particles are substantially spherical and have a density around 2.35 Kg/dm³. The main granulometric data of Sibelite® M 6000 particles are given in table 2.

TABLE 2

| Particle size distribution - Sibelite ® M 6000 | |
|---|---|
| Particle Sizes (µm) | Size distribution |
| >20 | None |
| >15 | 1% |
| >10 | 3% |
| >5 | 24% |
| >2 | 67% |
| >1 | 89% |

The particle sizes of table 2 were measured by using the standard Malvern laser diffraction method carried out with an analyzer "MASTERSIZER S" from GOFFYN MEYVIS. In table 2, the size distribution (second column) is expressed in volume percentage.

According, to table 2, 89% of the Sibelite® M 6000 particles have a size greater than 1 µm 67% of the Sibelite® M 6000 particles have a size greater than 2 µm, 24% of the Sibelite® M 6000 particles have a size greater than 5 µm, 3% of the Sibelite® M 6000 particles have a size greater than 10 µm; 1% of the Sibelite® M 6000 particles have a size greater than 15 µm.

Furthermore, the average particle size of the Sibelite® M 6000 is around 3 µm.

The compounding step is performed as follows with a co-extruder.

PET is first dried at 160° C. during 6 hours under dried air having a dew point of −60° C. The residual moisture content is approximately 42 ppm.

55 weight % of dried PET is gravimetrically dosed at the throat of a co-extruder. The co-extruder is a Berstorff Compex low-shear co-rotating twin-screw extruder.

The cristobalite (45 wt % of total weight) is added in the molten PET material in the co-extruder via a side feeder.

The temperature of the extruder zones are given in table 3:

TABLE 3

| Extruder-temperature profile | | | | | | | | | | | | |
|---|---|---|---|---|---|---|---|---|---|---|---|---|
| | Zones | | | | | | | | | | | |
| | Z1 | Z2 | Z3 | Z4 | Z5 | Z6 | Z7 | Z8 | Z9 | Z10 | Z11 | Z12 |
| Temperature (° C.) | 80 | 300 | 300 | 290 | 280 | 270 | 260 | 250 | 250 | 250 | 250 | 260 |

The side feeder (for adding the cristobalite in the extruder) is connected to the fifth extruder zone (Z5). The rotational speed of the extruder screw is settled to 180 rpm, and the material output is approximately 350 kg/hours In the compound, the inert cristobalite micrometrical particles (B) are thus dispersed in the polyester matrix formed by the polyester resin A1.

The molten compound is extruded into strings and cooled down in cold water bath (50° C.). Then pellets are cut by using a Rieter cutter. Pellets dimension is adjusted to be similar to the pellets of polyester resin (A2).

Blending Step—Final Material (A1/A2/B)—Examples No. 1 to No. 8

PET pellets (A2) and the aforesaid compound (A1/B) are dry blended at different weight percentages as summarized in table 4 below.

TABLE 4

Examples N° 1 to N° 8

| | Example N°# | | | | | | | |
|---|---|---|---|---|---|---|---|---|
| | 1 | 2 | 3 | 4 | 5 | 6 | 7 | 8 |
| Compound (A1/B) - wt % | 0 | 5 | 10 | 20 | 40 | 60 | 80 | 100 |

In all the examples No. 1 to No. 8, the PET pellets (A2) are virgin PET pellets of standard grade commercialized by VORIDIAN under reference "9921 w".

Example No. 1 is a reference example used for comparison with the polyester/silica compositions of the invention of examples No. 2 to 8.

The blend is then air dried during 6 hours at 160° C. (dew point of −51° C.) before melt processing.

Injection Step

The blend (A1/A2/B) is injected in a standard way in order to make monolayer preforms 1 of FIG. 1. Said preforms 1 have the well-known general following structure:
   a main tubular body 2 closed by a substantially hemispherical bottom end 3;
   a neck portion 4 including a collar 5, and an opened end-mouth 6.

The injection step of the preforms is performed on a Husky LX 160 injection machine having a two cavities injection mould.

For all examples No. 1 to No. 8, 1.5% of white masterbatch containing 60% of $TiO_2$ was added during the injection process.

The dimensions of the preforms are the same for all examples No. 1 to No. 8 and are summarized in table 5.

TABLE 5

| Example of preform dimensions | |
|---|---|
| wt(mm) | 2.1 |
| d (mm) | 20 |
| l (mm) | 72.5 |

In table 5:
wt is the preform wall thickness (measured in the main tubular body part 2);
d is the mean diameter of the preform
l is the developed length of the preform Due to density differences of the injected material, in examples No. 1 to No. 8, the weight of the preforms is increasing. For each example No. 1 to No. 8, the weight of the preforms is summarized in table 6.

TABLE 6 preform weight - Examples N° 1 to N° 8

| | Example N°# | | | | | | | |
|---|---|---|---|---|---|---|---|---|
| | 1 | 2 | 3 | 4 | 5 | 6 | 7 | 8 |
| Compound (A1/B) - wt % | 0 | 5 | 10 | 20 | 40 | 60 | 80 | 100 |
| Preform Weight (g) | 11.1 | 12 | 12.2 | 12.3 | 12.8 | 13.3 | 13.6 | 14.6 |

The injection process conditions were the same for all examples No. 1 to No. 8. The barrel temperature was between 275° C. and 290° C. on each heating zone of the injection machine. The cycle time was approximately 11.2 seconds.

The injection pressure and injection time for each example No. 1 to No. 8 are given in table 7.

TABLE 7

| | Example N°# | | | | | | | |
|---|---|---|---|---|---|---|---|---|
| | 1 | 2 | 3 | 4 | 5 | 6 | 7 | 8 |
| Compound (A1/B) - wt % | 0 | 5 | 10 | 20 | 40 | 60 | 80 | 100 |
| Injection pressure (bars) | 27.11 | 26.82 | 26.14 | 25.3 | 25.76 | 24.15 | 24.22 | 24.99 |
| Injection time (seconds) | 1.17 | 1.11 | 1.09 | 1.06 | 1.1 | 1.07 | 1.02 | 1.07 |

The addition of silica particles in the PET resin knowingly increases the thermal conductivity of the composition. One skilled in the art would thus have expected a quicker cooling down of the composition of example No. 2 to No. 8 as compared to the composition of example No. 1 (without silica particle) during the injection step, leading to higher injection time and pressure. Surprisingly, during the injection process, the injection pressure and the injection time of the composition of examples No. 2 to No. 8 are lower than the ones obtained with the composition of example No. 1. Against all expectations, the composition of the invention is thus easier to inject, which in turns notably enables to design and inject thinner preforms that are easier to blow.

Blow Moulding Step

Figure 2:
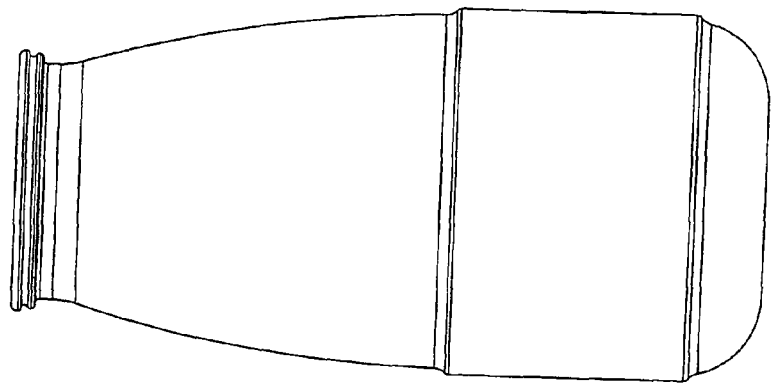
FIG. 2 is a schematic drawing of a monolayer small-sized container obtained by stretch blow moulding the preform of FIG. 1

The preforms of examples No. 1 to No. 8 are biaxially stretched and blow-moulded in order to make small-sized containers like the one shown on FIG. 2. The volume of the containers for each example is approximately 110 ml. The stretch ratios are the same for each example No. 1 to No. 8 and are given in table 8.

TABLE 8

| Stretch ratios - Examples N°1 to N°8 | |
|---|---|
| $S_a$ | 1.5 |
| $S_r$ | 2.5 |
| S | 3.75 |

In table 8:

$S_a$ is the axial stretch ratio and is defined in a standard way by formula:

$$S_a = \frac{L}{l}$$

wherein: (L) is the container developed length and (l) is the preform neutral fibre developed length.

$S_r$ is the radial stretch ratio and is defined in a standard way by formula:

$$S_r = \frac{D}{d}$$

wherein (D) is the maximum container outside diameter and (d) is the preform neutral fibre diameter.

S is the Overall stretch ratio and is defined in a standard way by formula:

$$S = S_a \times S_r$$

The blow moulding step was performed on a Sidel stretch blow moulding machine (SBO2/3®). The settings of the Sidel machine were the same for each examples No. 1 to No. 8 and are summarized in table 9.

TABLE 9

| Blowing machine settings | |
| --- | --- |
| General heating power | 60% |
| Zone 1 | 55% |
| Zone 2 | 55% |
| Zone 3 | 65% |
| Zone 4 | 85% |
| Output | 1000 bottle/mould · hour |
| Preblow pressure | 10.5 bars |
| Blow pressure | 20 bars |
| Blow mould temperature | 10° C. |
| Stretch rod diameter | 10 mm |

For all examples No. 1 to No. 8, a two-stage injection stretch blow moulding technique was used. According to this technique, the preforms are reheated for example by infrared radiations before their introduction in the blowing mould. In other variants of the invention, one skilled in the art can also use a one-stage injection stretch blow moulding technique (i.e. without a reheating step of the preforms prior to the blowing step)

Tests on Containers

Several tests have been performed on the containers.

Ash Content

The containers of examples No. 1 to No. 8 were burnt at 450° C. and the ash content weight after calcination was measured The results are summarized in table 10.

TABLE 10

| | Ash content | | | | | | | |
| --- | --- | --- | --- | --- | --- | --- | --- | --- |
| | Example N°# | | | | | | | |
| | 1 | 2 | 3 | 4 | 5 | 6 | 7 | 8 |
| Compound (A1/B) - wt % | 0 | 5 | 10 | 20 | 40 | 60 | 80 | 100 |
| Preform Weight (g) | 11.1 | 12 | 12.2 | 12.3 | 12.8 | 13.3 | 13.6 | 14.6 |
| Ash content (wt %) | 0.8 | 3.2 | 6.3 | 9.7 | 15.6 | 24.5 | 32.1 | 45.1 |

In example No. 2 to No. 8, the ash content corresponds to the real weight percentage of silica (on the total weight of the container).

Light Transmission

Light transmission spectrum (between 250 nm to 2500 nm) was measured through the wall of the containers for each example No. 1 to No. 8. For the light transmission measurements, a small square-shaped sample (approximately 1.5 cm×1.5 cm) was cut into the wall of the containers. The thickness of the sample was measured and the light transmission from 250 nm to 2500 nm was measured with a spectrophotometer Shimadzu 2401/2501.

Figure 3:
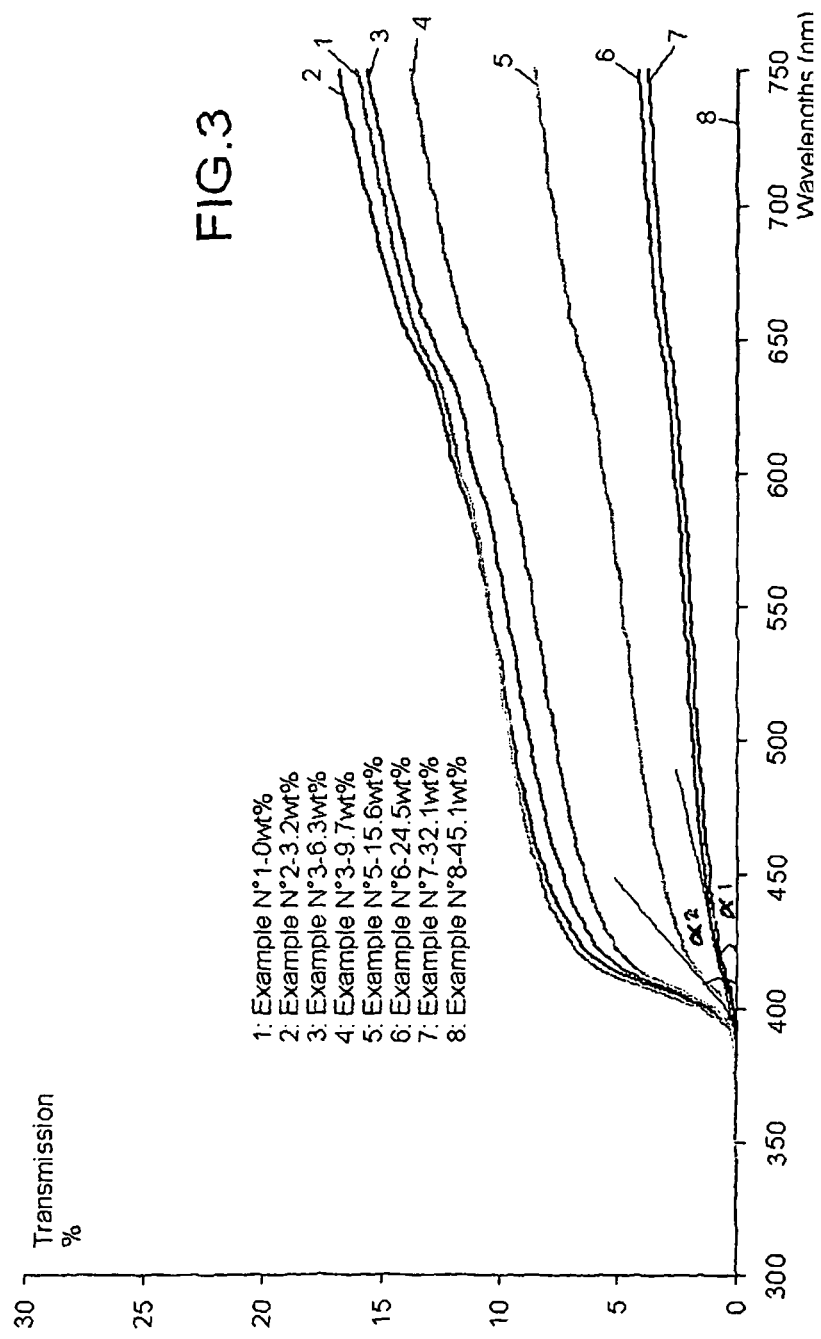
FIG. 3 shows the light transmission spectrum of containers made of different polymeric composition of the invention (graphs 2 to 8) and of a container essentially made of PET (graph 1)

The light transmission results between (300 nm and 750 nm) are depicted on the graphs of FIG. 3. The thickness and light transmission results for some particular wavelengths are also given in table 11.

TABLE 11

| Example N°# | Mineral content (wt %) | Thickness (mm) | Transmission @ | | | | | |
| --- | --- | --- | --- | --- | --- | --- | --- | --- |
| | | | 400 nm | 500 nm | 550 nm | 600 nm | 700 nm | 1000 nm |
| 1 | 0.8 | 570 | 1.45 | 9.56 | 10.5 | 11.72 | 14.95 | 21.54 |
| 2 | 3.2 | 550 | 1.11 | 9.46 | 10.51 | 11.91 | 15.55 | 22.8 |
| 3 | 6.3 | 680 | 1.02 | 8.76 | 9.78 | 11.11 | 14.49 | 21.34 |
| 4 | 9.7 | 610 | 0.93 | 7.68 | 8.62 | 9.79 | 12.76 | 18.94 |
| 5 | 15.6 | 960 | 0.32 | 4.13 | 4.82 | 5.66 | 7.82 | 12.22 |
| 6 | 24.5 | 740 | 0.11 | 1.87 | 2.23 | 2.65 | 3.78 | 5.91 |
| 7 | 32.1 | 890 | 0.08 | 1.62 | 1.96 | 2.36 | 3.43 | 5.32 |
| 8 | 45.1 | 870 | 0 | 0.01 | 0.02 | 0.03 | 0.06 | 0.15 |

The light transmission results show that for all examples No. 2 to No. 8, in the UV wavelengths (less than 400 nm), the light radiations are essentially stopped by the container wall. For wavelengths ranging from 400 nm to 700 nm (visible light), the percentage of light transmission is decreasing when the concentration of silica particles in the container is increasing.

Figure 4:
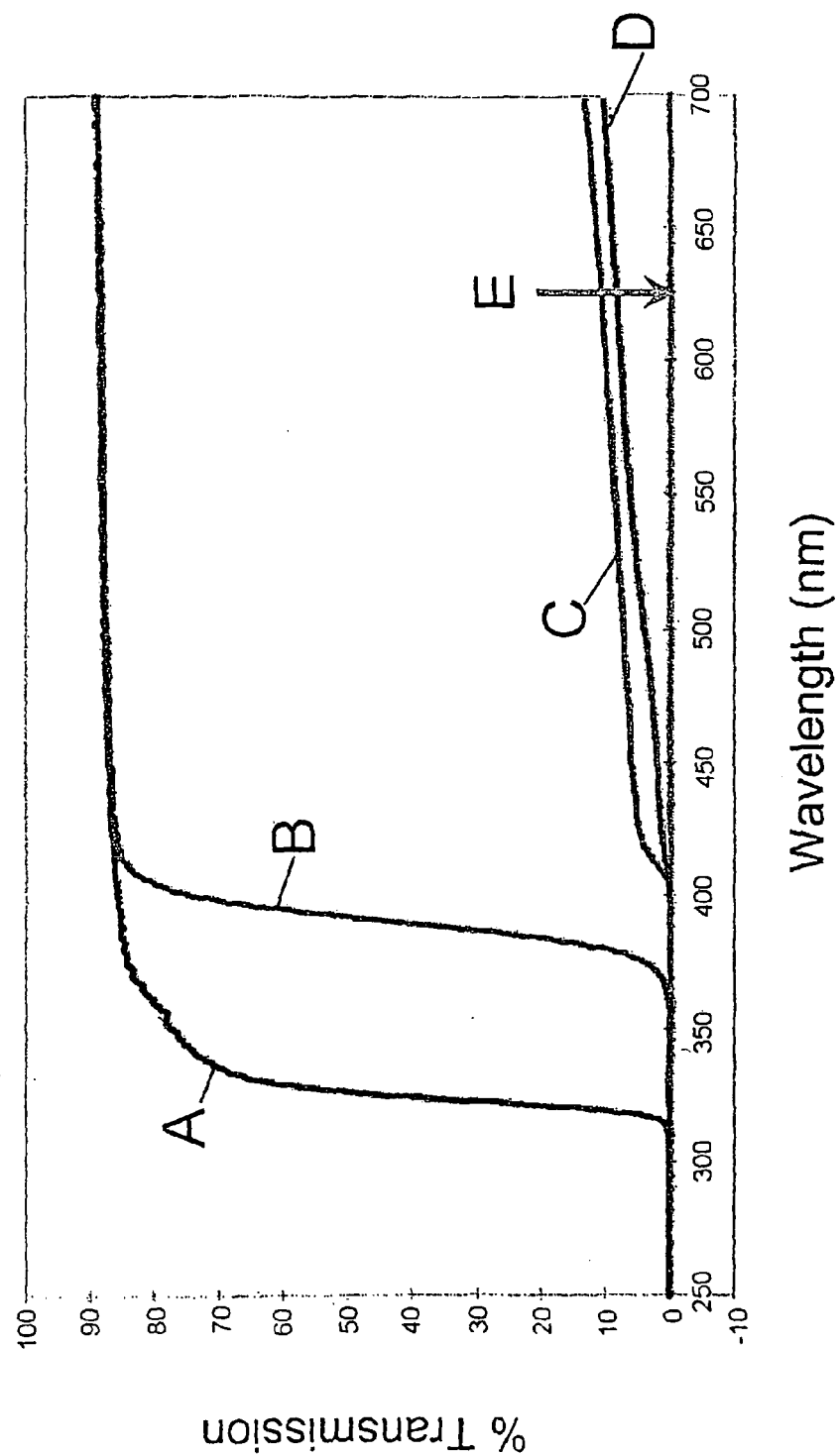
FIG. 4 shows the light transmission spectrum of five different containers of the prior art.

For comparison with the above results, FIG. 4 shows the light transmission spectrum graphs of a 1 liter container (weight 32 g) made of five different usual materials (A, B, C, D, and E):
A: Clear PET
B: Clear PET with UV blocker
C: PET and 3 wt % of $TiO_2$
D: PET and 4.8 wt % of $TiO_2$ and brown dyeing agent
E: Three layer container (white PET/black PET/white PET)

It has to be underlined that with the same container (1 l-32 g) and with $TiO_2$ concentration higher than 4.8 wt %, the light transmission spectrum of the container is not significantly improved as compared to the light transmission spectrum of the container made of material D. Said light transmission spectrum of the container (1 l-32 g) made of material D can thus be considered as a limit for this container.

Furthermore, in example D, brown dyeing agent has been added. This dyeing agent knowingly enables to lower the light transmission through the wall of the packaging for wavelengths ranging between 400 nm and 550 nm; the slope of curve D at 400 nm (FIG. 3) is lower than the slope at 400 nm of curve C. But, this brown dyeing agent dramatically impairs the whiteness of the container.

The comparison of FIGS. 3 and 4 shows that the dispersion in the PET resin of micrometrical silica particles strongly improves the optical performances of the containers, and enables to make containers that exhibits very good optical performances notably in the UV and visible lights wavelengths. The optical performances can be even better than those obtain with high concentration of $TiO_2$. More particularly, with high silica concentration (see example No. 8-45.1 wt % of silica particles), the visible light radiations (>400 nm) are surprisingly almost completely stop by the container wall. With high concentration of micrometrical silica particles, the light transmission spectrum is far better than the light transmission spectrum that would be achievable with the use of an opacifying agent only such as $TiO_2$, and is close to the results that are obtained with a multilayer container comprising a usual internal black layer.

More especially, referring to the light transmission spectrum graphs of FIG. 3, for wavelengths between 400 nm and 550 nm, the light transmission is advantageously lowered when the concentration of silica particles is increased. Referring more especially to the light transmission spectrum graphs of example No. 5 to No. 8, the slope at 400 nm of the light transmission is surprisingly dramatically lowered (FIG. 3/Example No. 5—angle $\alpha 1$; Examples No. 6 and 7 angle $\alpha 2$—Example No. 8—angle at 400 nm around zero). As shown by the results of FIG. 3 and table 11, for all examples No. 1 to No. 8, the light transmission at 400 nm is around 0%, but for example No. 1 ($TiO_2$ alone), the light transmission at 450 nm is around 8%. In comparison, for examples No. 5 to No. 8, the light transmission is advantageously less than 5% for wavelengths up to 550 nm.

The containers of the invention are thus suitable for storing products that are sensible to UV and visible lights radiations (i.e. that can be altered or degraded by UV and visible lights radiations and/or UV and visible lights radiations induced oxidation), such as for example dairy products, and in particular UHT milk beverages or the like.

When $TiO_2$ and a brown dyeing agent is added in the PET resin (example D of FIG. 4), it is also possible to lower the light transmission spectrum slope at 400 nm, but the colour of the bottle in no longer white, which is not acceptable for most food applications, especially in the dairy industry.

Figure 5:
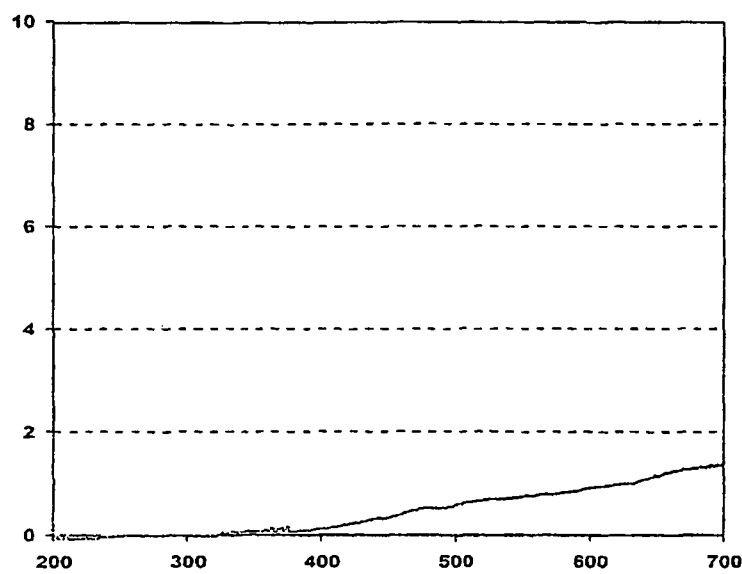
FIG. 5 shows the light transmission spectrum of a 200 ml bottle of the invention.

FIG. 5 shows the light transmission spectrum graph (from 200 nm to 700 nm) of a 200 ml bottle having a wall thickness around 450 μm and made of PET resin (standard grade commercialized by VORIDIAN under reference "9921 w") containing 20 wt % of micrometrical silica particles (Sibelite® M6000 particles). This additional example further shows a high improvement of the optical properties of the bottle (transmission at wavelengths up to 700 nm is less than 2%, and the slope at 400 nm of the light transmission spectrum is very low, the transmission at 550 nm being less than 1%).

Top Load Test

The objective of the test is to determine the vertical load that a container can withstand before deformation. The empty container under test is centered and positioned upright in the tester. The load plate is moved downward with a speed of 50 mm/min into contact with the container finish and the pressure is progressively increased until the container starts to be deformed. At the first deformation of the container, the load plate returns to its initial position. The top load value is obtained by reading the load value (kg) on the TOPLOAD tester (TOPLOAD tester INSTRON 1011). Topload results obtained for each example No. 1 to No. 8 are given in table 12.

TABLE 12

Top load results

| | Example N°# | | | | | | | |
|---|---|---|---|---|---|---|---|---|
| | 1 | 2 | 3 | 4 | 5 | 6 | 7 | 8 |
| Mineral content (wt %) | 0.8 | 3.2 | 6.3 | 9.7 | 15.6 | 24.5 | 32.1 | 45.1 |
| Maximum load (kg) | 34.2 | 74 | 78.1 | 55.7 | 64 | 54.9 | 51 | 41.3 |

These results show that the top load of the containers of the invention is improved (example No. 2 to No. 8) as compared to the top load of the reference container made of PET only (Example No. 1).

Water Vapour Transmission Rate (WVTR) at 22° C./50% RH

The water vapour transmission rate (WVTR) at 22° C. and 50% RH (Relative Humidity) has been measured for the container of examples No. 1 to No. 8 according to the standard method ASTM E 96. The results of the test are given in table 13.

TABLE 13

WVTR at 22° C./50% RH

| | Example N°# | | | | | | | |
|---|---|---|---|---|---|---|---|---|
| | 1 | 2 | 3 | 4 | 5 | 6 | 7 | 8 |
| Mineral content (wt %) | 0.8 | 3.2 | 6.3 | 9.7 | 15.6 | 24.5 | 32.1 | 45.1 |
| Water loss/day (mg) | 7.37 | 7.57 | 7.21 | 6.81 | 6.15 | 5.26 | 4.92 | 6.93 |

These results show that the WVTR of the containers of the invention is improved (example No. 3 to No. 8) as compared to the WVTR of the reference container made of PET (Example No. 1).

$O_2$ Ingress Test

The objective of the test is to determine the $O_2$ gas transmission rate of the container, i.e. the quantity of oxygen gas passing through the surface of the package per unit of time.

The testing apparatus is: Calibrated Oxygen Transmission Analysis System MOCON 2/20.

The carrier gas is: mixture of 97.5% $N_2$ and 2.5% $H_2$ (minimum of 100 ppm $O_2$)

The test method is derived from ASTM D 3895 (oxygen gas transmission rate through plastic film and sheeting using a coulometric sensor) and ASTM F 1307 (Oxygen transmission rate through dry packages using a coulometric sensor).

The finish of the empty container under test is sealed on a metal plate of the testing apparatus by using epoxy glue, and in order to have a leak tight seal between the container finish and the plate. (Waiting time in order to let the epoxy glue dry around 2 hours).

First the container under test is conditioned to remove all oxygen inside the container and to acclimate to the test conditions. This is done by purging the container with a stream of the carrier gas (gas flow of 10 ml/min) which transports most oxygen out of the container through holes in the metal plate. The outside of the container is exposed to a known concentration of air (=20.9% $O_2$) and $O_2$ will migrate through the container wall to the inside of the container.

After the conditioning period the stream of carrier gas with the migrated oxygen (same flow as conditioning) is transported to a coulometric detector that produces an electric current whose magnitude is proportional to the amount of oxygen flowing into the detector per unit of time (oxygen transmission rate in cm³/container/day). The transmission rates are measured for a certain period and the computer will determine when the container under test has reached equilibrium by comparing test results on a timed basis. This is called convergence testing and the convergence hours are set at 10. This means that the computer compares the test results of 10 hours before and examines the differences. Equilibrium is reached when the transmission rate varies between individual examinations by less than 1%.

The oxygen quantity (Z) passing through the wall container and measured in ppm of $O_2$/year is obtained by the following conversion formula:

$$Z(\text{ppm of } O_2/\text{year}) = [32*X/22.4*Y]*1000*365,$$

wherein:
X is the oxygen transmission rate in cm3/container/day (measured by the MOCON testing apparatus), and
Y is the brimful volume of the tested container in ml.

The $O_2$ permeability of containers of examples No. 1 to No. 7 has been measured according to the aforesaid procedure. The results for each example No. 1 to No. 7 are given in table 14.

TABLE 14

| $O_2$ permeability results at 22° C. (Mocon) | | | | | | | |
|---|---|---|---|---|---|---|---|
| | Example N°# | | | | | | |
| | 1 | 2 | 3 | 4 | 5 | 6 | 7 |
| Mineral content (wt %) | 0.8 | 3.2 | 6.3 | 9.7 | 15.6 | 24.5 | 32.1 |
| $O_2$ ingress (ppm/year) | 59.81 | 67.89 | 60.62 | 63.56 | 51.52 | 50.68 | 43.27 |

These results show that the $O_2$ permeability of the containers of the invention is not impaired by the addition of silica particles, and is even lower (examples No. 3 to No. 7) than the $O_2$ permeability of the reference container made of PET (Example No. 1).

Thermal Properties

The thermal stability of the containers of examples No. 1 to No. 8 has been tested according to the following procedure.

The container is filled with 100 ml of a liquid (water for temperature test below 100° C. and oil for temperature test above 100° C.). The containers are not closed. The filled and opened container is then heated in a microwave oven at different heating temperatures. For each heating temperature, the volume shrinkage of the container is measured.

The thermal stability results (in terms of % of volume loss) are given in table 15.

TABLE 15

| Thermal stability results | | | | | | | | | |
|---|---|---|---|---|---|---|---|---|---|
| Ex. | WATER OR OIL TEMPERATURE (° C.) | | | | | | | | |
| N°# | 64 | 69 | 81 | 86 | 90 | 96 | 102 | 108 | 117 |
| 1 | 0.9 | 1.8 | 33.1 | x | x | x | x | x | x |
| 2 | 0.3 | 0.4 | 21.4 | x | x | x | x | x | x |
| 3 | 0.4 | 2 | 18.2 | x | x | x | x | x | x |
| 4 | 0.2 | 0.7 | 13.2 | 17.2 | x | x | x | x | x |
| 5 | 0.1 | 1 | 6.8 | 12.2 | 12.5 | x | x | x | x |
| 6 | 0.5 | 1 | 5.2 | 7.7 | 8.5 | 9.5 | 9 | 10.3 | 12 |
| 7 | 0.9 | 1.3 | 7.9 | 8.8 | 8.8 | 10.2 | 8.9 | 11 | 12.1 |
| 8 | 0.6 | 0.9 | 4.5 | 8 | 8.3 | 8.25 | 8 | 9 | 10.4 | x: stability loss (excessive shrinkage)

We can observe an improvement of the thermal stability of the containers of the invention, in particular at high temperature (>80° C.) and with higher silica content.

The thermal stability of the containers can of course be further enhanced by using the well-known heat set process.

Silica Concentration/Preform Thickness/Stretch Ratio

In respect to the container performances and in particular light transmission spectrum, top load, thermal stability, and barrier properties to $O_2$ and to water vapour, higher performances are obtained when the concentration of micrometrical silica particles is increased in the container.

It should be however underlined that there is a relationship between three parameters namely: Silica concentration; preform thickness; stretch ratio.

At high concentration, the silica particles render the preforms more difficult to stretch. For example, it has been tested that with a silica concentration of 20 wt %, preforms having a wall thickness (wt) of 4 mm were difficult to blow into containers with an overall stretch ratio (S) around 10. It has been also been tested that with a silica concentration of 32 wt %, preforms having a wall thickness (wt) of 2.9 mm were difficult to blow into containers with an overall stretch ratio (S) around 10.

The polyester resin containing silica particles is however surprisingly easier to inject than the polyester resin alone. With the polyester/silica composition of the invention, it is thus advantageously possible to design thinner preforms, which thinner preforms are easier to stretch-blow mould into containers. For example, preforms having a wall thickness of 1.8 mm and made of a PET resin (standard grade) containing 60 wt % of micrometrical silica particles (Sibelite® M6000 particles) have been successfully injected and stretch-blow moulded into bottles with an overall stretch ratio of approximately 3.75.

In conclusion, when practising the invention, it is preferable to use high concentration of micrometrical silica particles in the polyester composition, because all the main properties required for the packaging article (low transmission at wavelengths up to 700 nm, and especially at wavelengths between 400 nm and 550 nm, thermal stability, gas barrier properties, mechanical properties, in particular topload) are enhanced and the production cost of the polymeric composition is lowered. With high concentration of micrometrical silica particles, the preforms are more difficult to stretch-blow mould. Hence, with high concentration of micrometrical silica particles, it is more preferable (but not compulsory) to use low stretch ratio and/or thinner preforms; typically, the overall stretch ratio of the preforms will be for example preferably less than 9, more preferably less than 5, and even more preferably less than 4, and/or the wall thickness preform will be very preferably less than 3 mm, more preferably less than 2.5 mm, and even more preferably less than 2 mm.

The invention is not limited to the examples previously described. In particular, the composition of the invention can be used for making containers with higher stretch ratios and/or with bigger dimensions.

The invention claimed is:

1. A packaging article comprising:
   a wall made from a polymeric composition comprising:
      a polyester resin; and
      a plurality of micrometrical silica particles dispersed in the polyester resin,
   a micrometrical silica particle concentration being at least 40 wt %, wherein a thickness of the wall and the concentration of micrometrical silica particles in the composition are configured such that a light transmission through the wall is less than 10% at wavelengths ranging at least from 400 nm to 550 nm, and
   the packaging article is a rigid container that is biaxially stretched;
   wherein:
      the silica particles contain at least 99 wt % of $SiO_2$;
      the silica particles include at least one of cristobalite and quartz particles;
      the wall includes only a single, monolayer of the polyester resin and the plurality of micrometrical silica particles;
      the packaging article is an injection stretch blow moulded rigid container;
      the packaging article has a lower light transmission than the same packaging article made of the same composition but without silica particles;
      the packaging article has a lower permeability to $O_2$ than the same packaging article made of the same composition but without silica particles;
      the packaging article has a lower permeability to water vapour than the same packaging article made of the same composition but without silica particles;
      the packaging article has a higher top load than the same packaging article made of the same composition but without silica particles;
      the packaging article has a higher thermal stability than the same packaging article made of the same composition but without silica particles;
      the packaging article is operable for storing a product that is sensitive to at least one of UV radiations and visible light radiations; and
      the packaging article is operable for storing a dairy product.

2. The packaging article of claim 1, wherein the polyester resin comprises one of a PET homo or copolymer.

3. The packaging article of claim 1 wherein at least part of the micrometrical silica particles have a size greater than 2 μm.

4. The packaging article of claim 3, wherein at least 50% of the micrometrical silica particles have a size greater than 2 μm.

5. The packaging article of claim 3, wherein at least part of the micrometrical silica particles have a size greater than 5 μm.

6. The packaging article of claim 5, wherein at least part of the micrometrical silica particles have a size greater than 10 μm.

7. The packaging article of claim 6, wherein at least part of the micrometrical silica particles have a size greater than 15 μm.

8. The packaging article of claim 1, wherein the micrometrical silica particles have a size between 1 μm and 20 μm.

9. The packaging article of claim 1, wherein the micrometrical silica particles have an average size of 3 μm.

10. The packaging article of claim 1, wherein the thickness of the wall of the packaging article and the concentration of micrometrical silica particles in the composition are configured in order to obtain a light transmission through the packaging article wall that is less than 10% at wavelengths ranging at least from 300 nm to 700 nm.

11. The packaging article of claim 1, wherein the thickness of the wall of the packaging article and the concentration of micrometrical silica particles in the composition are configured in order to obtain a light transmission through the packaging article wall that is less than 5% at wavelengths ranging at least from 400 nm to 550 nm.

12. The packaging article of claim 11, wherein the thickness of the wall of the packaging article and the concentration of micrometrical silica particles in the composition are configured in order to obtain a light transmission through the packaging article wall that is less than 5% at wavelengths ranging at least 300 nm to 700 nm.

13. The packaging article of claim 1, wherein the thickness of the wall of the packaging article and the concentration of micrometrical silica particles in the composition are configured in order to obtain a light transmission through the packaging article wall that is less than 2% at wavelengths ranging at least from 400 nm to 550 nm.

14. The packaging article of claim 13, wherein the thickness of the wall of the packaging article and the concentration of micrometrical silica particles in the composition are configured in order to obtain a light transmission through the packaging article wall that is less than 2% at wavelengths ranging at least from 300 nm to 700 nm.

15. The packaging article of claim 1, wherein the thickness of the wall of the packaging article and the concentration of micrometrical silica particles in the composition are configured in order to obtain a light transmission through the packaging article wall that is less than 1% at wavelengths ranging at least from 400 nm to 550 nm.

16. The packaging article of claim 15, wherein the thickness of the wall of the packaging article and the concentration of micrometrical silica particles in the composition are configured in order to obtain a light transmission through the packaging article wall that is less than 1% at wavelengths ranging at least from 300 nm to 700 nm.

17. The packaging article of claim 1, wherein the thickness of the wall of the packaging article and the concentration of micrometrical silica particles in the composition are configured in order to obtain a light transmission through the packaging article wall that is less than 0.5% at wavelengths ranging at least from 400 nm to 550 nm.

18. The packaging article of claim 17, wherein the thickness of the wall of the packaging article and the concentration of micrometrical silica particles in the composition are configured in order to obtain a light transmission through the packaging article wall that is less than 0.5% at wavelengths ranging at least from 300 nm to 700 nm.

* * * * *